Aug. 3, 1965                L. CHADENSON                3,198,140
          VEHICLE BODY STRUCTURE FOR OVERHEAD RAILWAYS
                      WITH SUSPENDED VEHICLES
Filed May 3, 1963                                 3 Sheets-Sheet 1
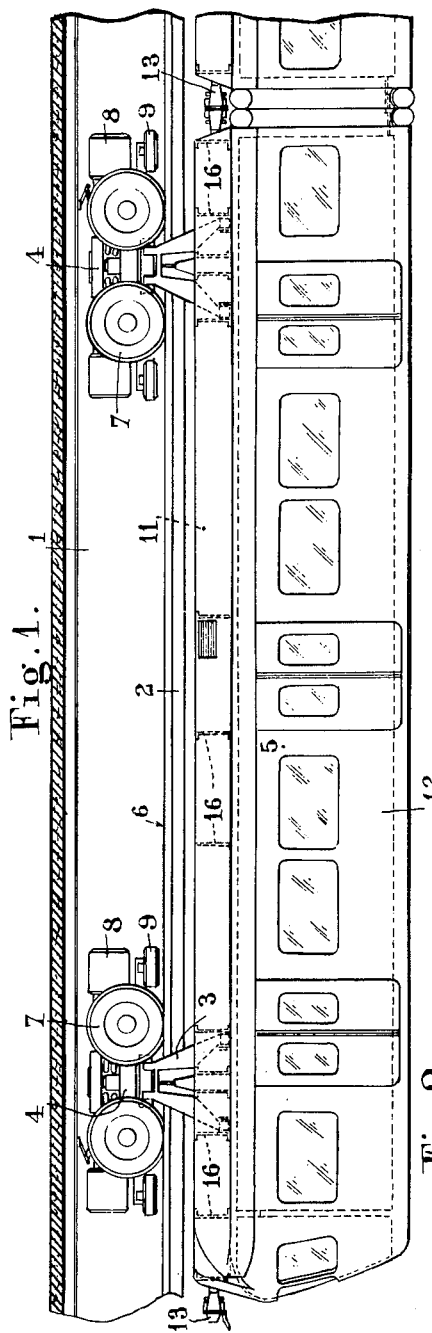
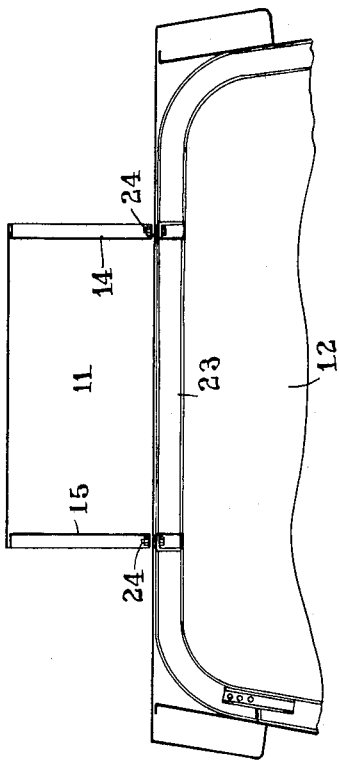
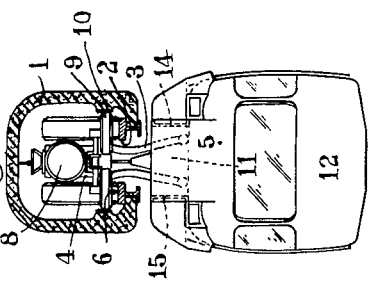

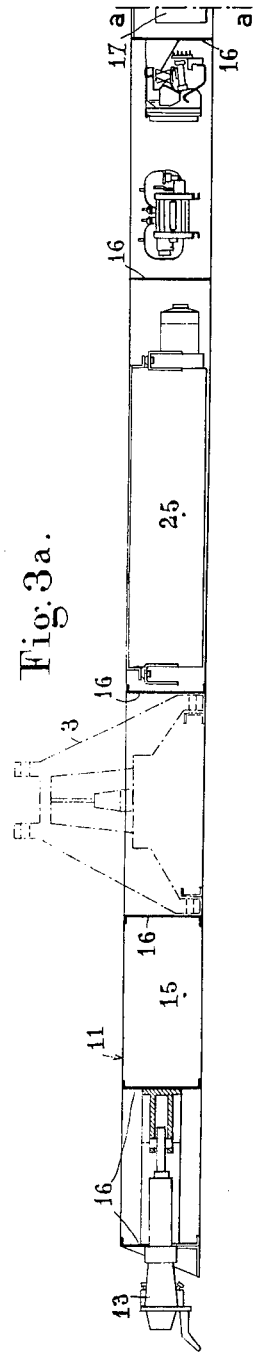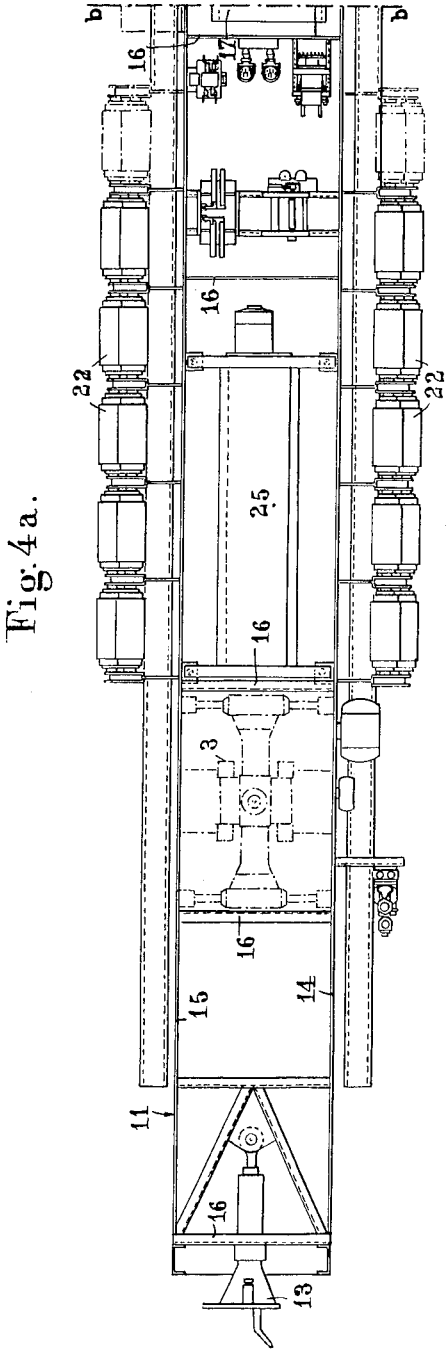

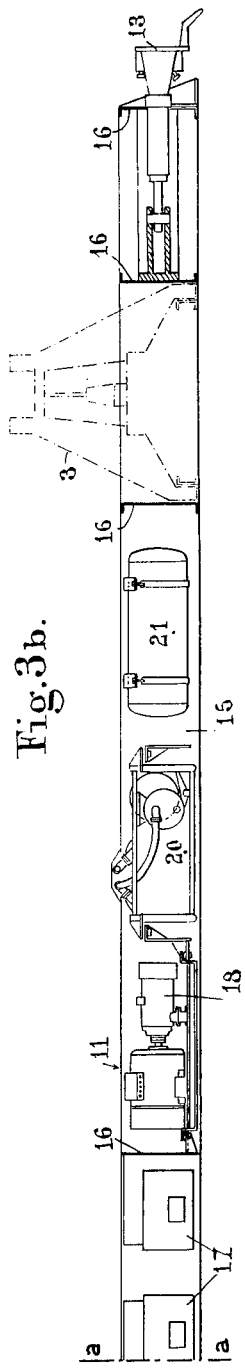
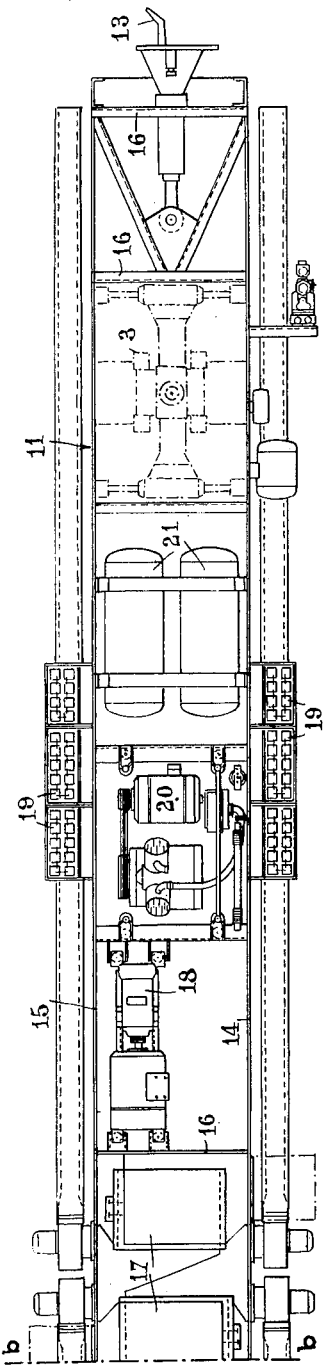

United States Patent Office
3,198,140
Patented Aug. 3, 1965

3,198,140
VEHICLE BODY STRUCTURE FOR OVERHEAD RAILWAYS WITH SUSPENDED VEHICLES
Lucien Chadenson, Paris, France, assignor to Safege-Transport, Paris, France
Filed May 3, 1963, Ser. No. 277,890
Claims priority, application France, Feb. 15, 1963, 924,969, Patent 1,356,455
4 Claims. (Cl. 105—150)

In prior U.S. Patents No. 2,825,291 of Mar. 4, 1958 and No. 3,059,591 of Oct. 23, 1962 the applicant has shown and described an overhead railway or elevated railway system wherein the vehicles are suspended from a track carried by a suitable frame structure.

The bodies of the vehicles are disposed beneath the bogie trucks and connected thereto by means of suspension members extending as a rule vertically, the bogie trucks themselves being carried by a rolling track or raceway formed in a box-sectioned beam and rolling inside this beam with the suspension members extending through a longitudinal slot formed symmetrically to the axis of the lower portion of the box-sectioned beam.

It is the essential object of the present invention to provide a specifice form of embodiment of body structures for vehicles designed for operation in elevated railway systems of the type set forth hereinabove, with the dual purpose of permitting their mass production without difficulty and facilitating the use of different types of body styles for different kinds of traffic or transport conditions and requirements.

To this end, the vehicle body structure for elevated railway systems according to this invention consists essentially of two sections:

(a) A block beam constituting the stress resisting element of the body structure and consisting of two longitudinal and parallel members disposed at roof level of the body and having secured there on on the one hand the pendular suspension members disposed as a rule vertically for connecting the body to the pair of bogie trucks of the vehicle, and on the other hand at the two longitudinal ends of said block-beam the buffer and coupling means of the vehicle.

(b) The body proper, secured on said block-beam and containing the equipments necessary for transporting passengers and if required controlling the train of vehicles.

If desired, the main section of the equipments, wiring and lines, notably the electric wiring, the mechanical and pneumatic pipe lines and means necessary for operating the trains of vehicles, may also be secured on said block-beam, preferably in the form of easily inspected and detachable assemblies or units. The bodywork in this case contains only the means necessary for circulating and diffusing conditioned air, together with additional heating means if necessary, lighting equipments, door-control means and the mechanisms for controlling the trains of vehicles which may be housed in special or separate control cabs when the vehicles are to be equipped with such cabs.

The block-beam and the body of the vehicle may thus be constructed separately. These bodies may have different lengths, widths, doors and equipments to suit the various types of traffic contemplated.

On the other hand, the block-beams are constructed according to a single design, except for their length which is necessarily that of the bodies to be associated therewith.

The attached drawings illustrate diagrammatically by way of example a typical form of embodiment of this invention. In the drawings:

FIGURE 1 is an elevational view with parts broken away;

FIGURE 2 is a cross section;

FIGURES 3a and 3b are elevational views showing on a larger scale the block-beam, both figures forming together a single view when connected along the cross lines aa;

FIGURES 4a and 4b are plan views from above showing the aforesaid block-beam on the same scale as in FIGS. 3a, 3b, these two figures forming together a single view when connected along the cross lines bb; and FIGURE 5 is a diagrammatic cross-sectional view showing on a still larger scale the block-beam and the upper portion of the body of the vehicle.

The raceway or track consists of a box-sectioned beam 1 open centrally along its lower portion 2 to permit the passage of the pendular suspension members 3 connecting the bogie trucks 4 to the bodies 5 of the vehicles. The bogie trucks 4 roll on inner and lower raceways 6 of said box-sectioned beam 1 by means of tire-mounted wheels 7 driven from electromotors 8. Other tire-mounted wheels 9 disposed horizontally and rotating freely on vertical shafts engage the inner vertical faces 10 of the box-sectioned beam 1 for guiding the movements of the bogie trucks 4.

The body 5 of each vehicle consists of two main elements, namely the block-beam 11 and the body proper 12. The two pendular suspension members 3 connecting the bogie-trucks to the body are attached to the block-beam.

The two coupling and buffer devices 13 are disposed at either end of the block beam 11. The block beam proper consists of two longitudinal, parallel and as a rule vertical members 14, 15 braced by cross members such as 16. Secured on this block-beam 11 in the form of easily inspected and detachable assemblies or units are the various equipments which consist for instance of:

The driving and braking electrical equipment 25 with the starting rheostats 22;

The air-conditioning system 17;

The converter unit 18 and storage batteries 19;

The compressor unit 20 and air reservoirs 21.

As shown in diagrammatic form in FIG. 5, the upper portion 23 of the roof of the body 12 is attached at 24 to the block-beam 11 and the assembly consisting of said block-beam and said body constitutes the body structure of the vehicle. These two sections are constructed separately and subsequently assembled by means of adequate fastening members 24.

It would not constitute a departure from the basic principles of this invention to provide other types of block-beams, as well as other types of electrical, mechanical, pneumatic or other equipments, and different means for assembling the body and block-beams.

What I claim is:

1. A body structure of vehicle for elevated railway system utilizing vehicles suspended from two bogie trucks, said body structure consisting of two elements constructed separately, the first element being a block-beam constituting the stress-resisting element of the structure and comprising two longitudinal parallel members disposed at the level of the roof of the vehicle body and carrying the pendular suspension members extending vertically over them and adapted to connect said body structure to the two bogie trucks of the vehicle, and, at its two longitudinal ends, the buffer and coupling means of the vehicle, the other element of the body structure consisting of the body proper suspended from said block-beam and secured to it containing the equipments necessary for the passenger traffic.

2. A body structure as set forth in claim 1, wherein said block-beam carries in the form of easily inspected and detachable assemblies all the mechanical, electrical, pneumatic and air-conditioning equipments of the vehicle.

3. A body structure as set forth in claim 1, wherein said body proper is attached to said block-beam.

4. A body structure as set forth in claim 1 wherein its second element contains the equipment for controlling the trains of vehicles.

References Cited by the Examiner
UNITED STATES PATENTS

| | | | |
|---|---|---|---|
| 2,825,291 | 3/58 | Chadeson | 104—94 |
| 3,055,314 | 9/62 | Cox | 105—150 |
| 3,059,591 | 10/62 | Chadeson | 104—94 |
| 3,092,039 | 6/63 | Lich | 105—150 |
| 3,092,041 | 6/63 | Goodell et al. | 105—153 |
| 3,095,828 | 7/63 | Deller | 105—144 |

MILTON BUCHLER, *Primary Examiner.*

LEO QUACKENBUSH, *Examiner.*